Aug. 25, 1964   F. S. BASTER   3,145,696
INTERNAL COMBUSTION ENGINE
Filed Aug. 31, 1962   4 Sheets-Sheet 1

INVENTOR.
FOREST S. BASTER
BY
*Watts & Fisher*
ATTORNEYS

INVENTOR.
FOREST S. BASTER
BY
Watts & Fisher
ATTORNEYS

Aug. 25, 1964    F. S. BASTER    3,145,696
INTERNAL COMBUSTION ENGINE
Filed Aug. 31, 1962    4 Sheets-Sheet 4

INVENTOR.
FOREST S. BASTER
BY
*Watts & Fisher*
ATTORNEYS

3,145,696
INTERNAL COMBUSTION ENGINE
Forest S. Baster, Beachwood, Ohio, assignor to The White Motor Company, Cleveland, Ohio, a corporation of Ohio
Filed Aug. 31, 1962, Ser. No. 220,678
24 Claims. (Cl. 123—59)

This invention relates generally to internal combustion reciprocating piston engines, and more particularly to improved intake porting construction for such internal combustion engines.

In such internal combustion engines, fuel and air to support combustion of the fuel are introduced into each engine combustion chamber once each cycle. The air to support combustion is introduced into the combustion chamber through a passage known as an "intake port." The fuel may either be entrained in the air prior to the passage of the air into the combustion chamber and/or separately introduced into the combustion chamber, as by fuel injection. The fluid flowing through the intake port, which may or may not include entrained fuel, is referred to generically in the art as the "working fluid." Poppet type valves are commonly employed to selectively open and close the exit of the intake port.

One class of engine is known as the "open chamber" class. In this class of engine, substantially no portion of the volume of a combustion chamber has a radial distance from the axis of its cylinder greater than the radius of the cylinder wall. Also in one type of engine of this class, the valve for the intake port is located in the cylinder head and the head, together with the cylinder wall and piston, defines the combustion chamber. Engines of this type are generally referred to as "valve-in-head, open chamber engines" and this invention is directed to improvements in this type of engine.

In designing valve-in-head, open chamber engines, some in the art have recognized that if the working fluid is introduced into each combustion chamber in a fashion such that a vortex is formed within the cylinder during the intake stroke, the combustion efficiency of the engine may be enhanced. This vortex is known as a "swirl."

This invention is especially directed to improvements in valve-in-head, open chamber engines which swirl the working fluid in the combustion chamber. This invention reduces the problem of obtaining swirl in a combustion chamber, which has been fundamentally two-fold: first, discernment of the location and shape of an intake port producing optimum swirl for a given combustion chamber for expected operating conditions, and second, obtaining consistent reproduction of such swirl in production engines, not only from engine to engine but from cylinder to cylinder in multi-cylinder engines.

Generally the prior proposals for producing an effective swirl utilized an intake port which produced a venturi-like effect. Thus, the usual intake port has a convergent, horn-shaped configuration so that, as the working fluid passes through the intake valve orifice and enters the combustion chamber, velocity of the fluid is increased. This velocity increase is intended to achieve an objective of increasing the orifice efficiency at the intake valve and, thereby, "pack" more working fluid into the combustion chamber during intake. It now appears from this invention that the foregoing venturi or nozzle type of port design and other types of port design have several inherent disadvantages. Among these disadvantages, as this invention demonstrates, is that, on commercially produced engines, it has been necessary to use cast cylinder heads in which the ports were left in an "as cast" condition with the relatively rough surfaces characteristic of castings. It now appears that these rough surfaces create eddy currents and turbulence in the working fluid passing through the intake port that lessen the swirl and reduce combustion efficiency to a substantially greater degree than could be appreciated in the absence of constructions having the precision obtainable by this invention. Also, as a consequence of the fact that an intake port designed according to this invention avoids the venturi-like contours sought in prior designs and has a substantially lower orifice efficiency than many prior intake ports, it would now appear that such theoretically more efficient venturi-type port designs of the prior art, as measured by their orifice efficiency, may themselves have interfered with the combustion and consequent thermodynamic efficiency of the engines.

Further, the use of intake ports in an "as cast" condition can result in variations in size and contour of intake ports as well as variations in the angular relationship of the ports with respect to their associated combustion chambers. In a multiple cylinder internal combustion engine, it is highly important that the intake port for each cylinder duplicate as exactly as possible the intake port for each other cylinder. Otherwise, such variations from one cylinder to another necessarily result in an engine in which one or more of the combustion chambers will not perform at their designed efficiency.

Where the prior art has provided an intake port formed so that the working fluid is introduced into the combustion chamber in a direction skew to the axis of the cylinder, the exit of the port at the valve seat will usually define a non-circular orifice which must join with a circular valve seat. The prior art practices have heretofore resulted in the formation of one or more lips at this junction. This invention demonstrates that such lips interrupt the smooth, even flow of the working fluid emitted into the cylinder, causing turbulence and eddy currents which detrimentally affect the swirl pattern and decrease combustion efficiency.

With this invention, the above disadvantages of the prior art and others have been overcome, and extraordinary improvements in combustion efficiency have been obtained. For example, compression ignition, i.e., diesel, engines made in accordance with this invention have demonstrated increases in combustion efficiency of 12% or more over commercial engines of comparable size, and these improvements in combustion efficiency are consistently reproducible in production. Spark ignition gasoline engines have shown increases of 15% and higher in combustion efficiency to a point where the efficiency of the spark ignition gasoline engine has equaled that of some compression ignition engines of comparable horse power.

Comparison exhaust tests on the ten point scale of a Bachrach Smoke Density indicator further demonstrate the remarkable improvements in efficiency which have been obtained in compression ignition engines made according to this invention. These tests have consistently shown improvement of two smoke numbers and on occasion as high as three or four smoke numbers over comparable and leading production engines employing prior art intake port design. Spark ignition gasoline engines incorporating the features of this invention have operated efficiently on fuel air mixtures as lean as 20 to 1 as compared with mixtures in the order of 17 to 1 in engines employing prior art ports but otherwise identical.

Accordingly, a principal object of this invention is to provide an internal combustion engine with novel and improved intake ports which produces both increased combustion efficiency and consistently reproducible combustion efficiency.

A related object of the invention is to provide a novel and improved multiple cylinder internal combustion engine in which each intake port is substantially identical to all ports.

Other objects and a fuller understanding of the invention may be had by referring to the following description and claims taken in conjunction with the accompanying drawings in which:

Figure 3:
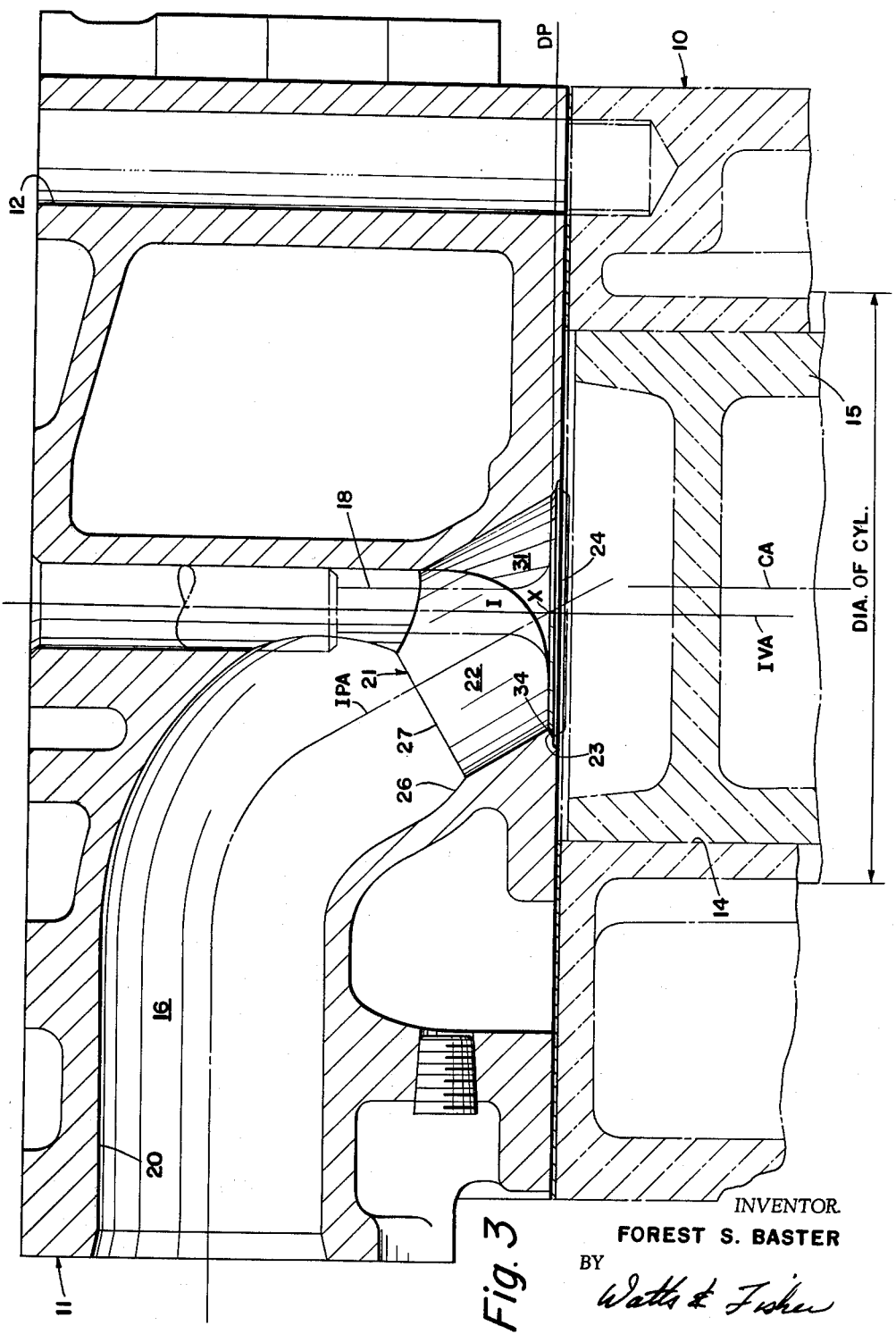
FIGURE 3 is a vertical cross sectional view, taken along the line 3—3 of FIGURE 1, of a specific embodiment of a cylinder head of an engine made according to this invention and shows in phantom section the engine block to which the cylinder head is secured.

Referring now to the drawings, a portion of a conventional engine cylinder block is shown in phantom as 10 in FIGURE 3. A cylinder head 11 is secured to the block 10 by suitable and conventional means, as by studs (not shown) which are normally positioned in bores 12, only one of which is shown. The cylinder block 10 includes a plurality of cylindrically contoured bores 14 referred to in the art as cylinders. A piston 15 is reciprocally mounted in each cylinder 14 so that the walls of the cylinder, the piston 15, and the head 11 define a combustion chamber.

Figure 1:
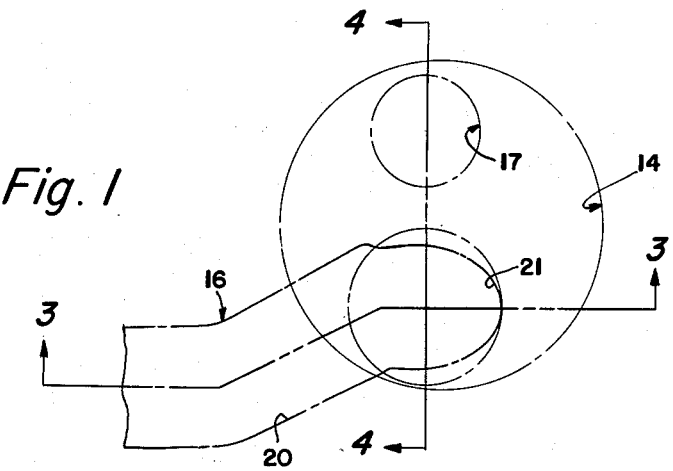
FIGURE 1 is a diagrammatic view showing, in an engine made according to this invention, the size, contour, and orientation of a cylinder wall, exhaust valve opening and intake valve opening as the same appear when projected in outline upon a plane perpendicular to the axis of a cylinder.
Figure 4:
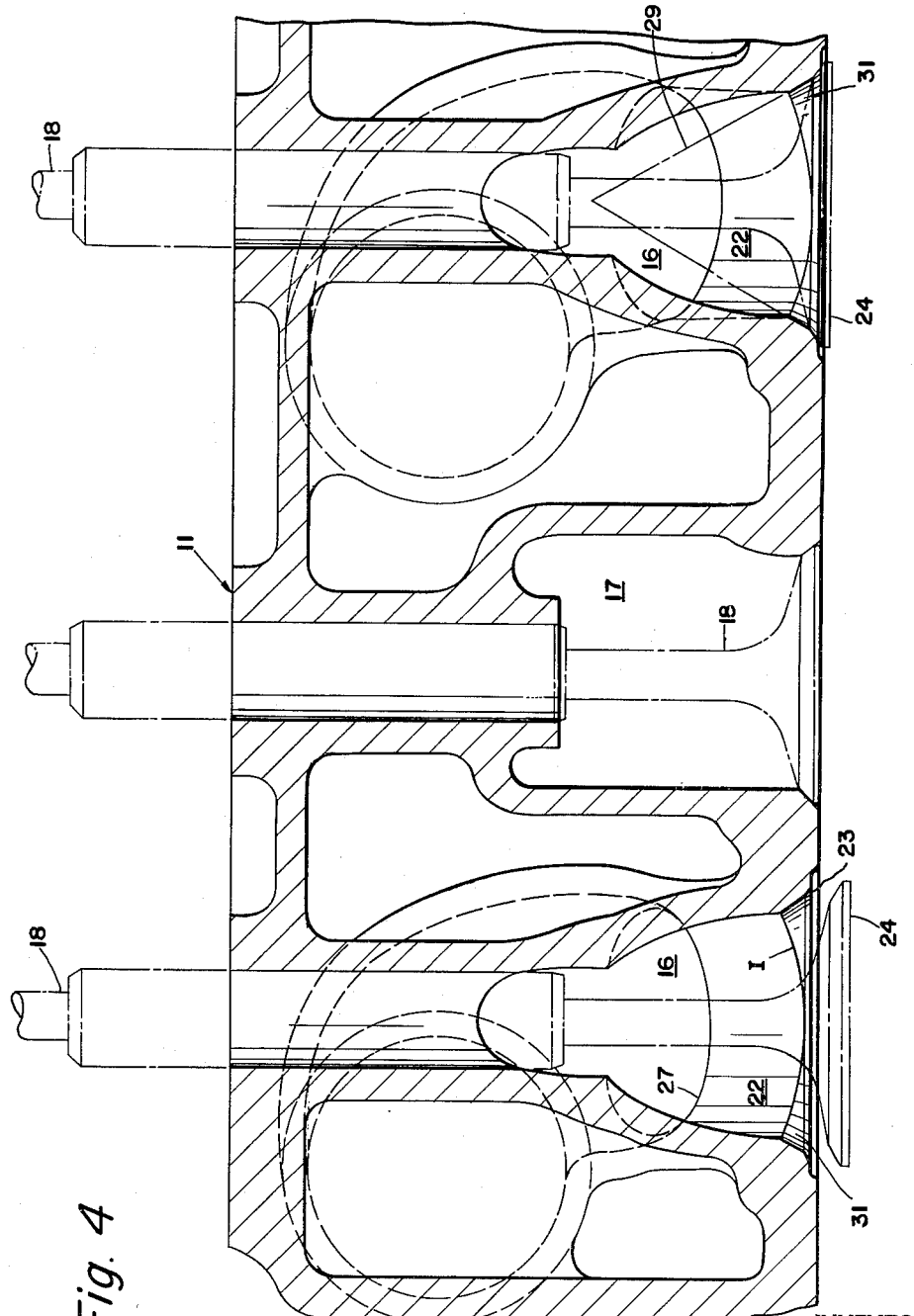
FIGURE 4 is a vertical longitudinal section of a cylinder head of a multi-cylinder engine made according to this invention taken in the plane indicated by the line 4—4 of FIGURE 1.

As is seen in FIGURE 4 and suggested by the schematic representation in FIGURE 1, one intake port 16 and one exhaust port 17 communicate with each of the cylinders 14. Each of these ports is closed by the usual reciprocal poppet type valve, such as shown in phantom as 18 in FIGURES 3 and 4.

The advantages in combustion efficiency of internal combustion engines made according to this invention are obtained through the construction of the intake port. In the disclosed specific embodiment of an engine made in accordance with this invention, the cylinder 14 and the piston 15 are shown with a common vertical axis CA. The intake port 16 includes an enlarged upstream entrance portion 20 having a horizontal center line. The port 16 curves gradually inwardly and downwardly from its horizontal entrance portion 20 until its center line coincides with an intake port axis IPA of a flow directing outlet portion 21. The axis IPA is skew to the axis of the cylinder and intersects intake valve axis IVA at a point X. For the purpose of showing the orientation of the intake port axis IPA with respect to the cylinder 14, a datum plane DP is shown in the drawings. This plane is perpendicular to the axis of the cylinder 14 and includes the point X.

A valve seat 23 having a truncated right conical surface is formed at the exit of the port 16. The circular valve seat 23 intersects the datum plane DP and is centered on the axis of the intake valve 18. Thus, the point of intersection X may also be considered as substantially the center of the circular opening of the valve seat in those variations from the disclosed embodiment where the point X cannot be more precisely located by the intersection of the intake valve axis IVA and the intake port axis IPA because of actual or substantial coincidence of those two axes. The seat in the specific embodiment shown is a so-called 30 degree seat, that is, the included angle of the apex of the projected cone of the seat is 120 degrees. The head 24 of the valve 18 and the valve seat coact to close the intake port whenever working fluid is not being introduced into the combustion chamber.

The flow directing outlet port portion 21 is a swirl producing portion and it is between and adjacent the valve seat 23 and the enlarged upstream portion 20. The enlarged upstream portion 20 tapers gradually inwardly at 26 to a junction 27 with the outlet portion 21.

It has been discovered that, if the outlet portion 21 is smoothly and accurately formed to a contour and properly located skew to the cylinder axis in a manner which will be described below, substantial improvements in combustion efficiency are obtained. To obtain the full benefit of this discovery, the outlet portion 21 of the port is machined or otherwise formed to a cylindrical section 22 preferably having a smoothness of 50 microinches, or smoother, while the upstream portion 20 is left in its "as cast" condition. During the preferred order of steps of manufacture this cylindrical section 22 is machined to extend from the junction 27 to an elliptical exit at the valve seat 23.

When the cylinder head is so made by conventional methods leaving a relatively rough cast surface, any core or pattern intended to provide an opening in the rough casting which is to be enlarged by machining to form the outlet portion 21 should be of substantially lesser diameter than the finished cylindrical portion 22. This is done not only to provide ample metal at a given port, but it also permits the precise location of all ports with respect to each other in a given cast head. Further, this also permits the precise duplication of all ports in all heads produced by mass production casting techniques despite the substantial variations between individual castings produced by such techniques.

In order to provide a faired, divergent transition between the machined cylindrical section 22 and the circular valve seat 23, a section 31 of the outlet portion 21 of the port is machined to a configuration which is a segment of a cone. The conical section 31 of the outlet portion 21 is axially aligned with the valve and its diameter at the inner edge of the valve seat is substantially equal to the major axis of the elliptical exit which would otherwise be left at the datum plane DP by the cylindrical section 22.

Figure 2:
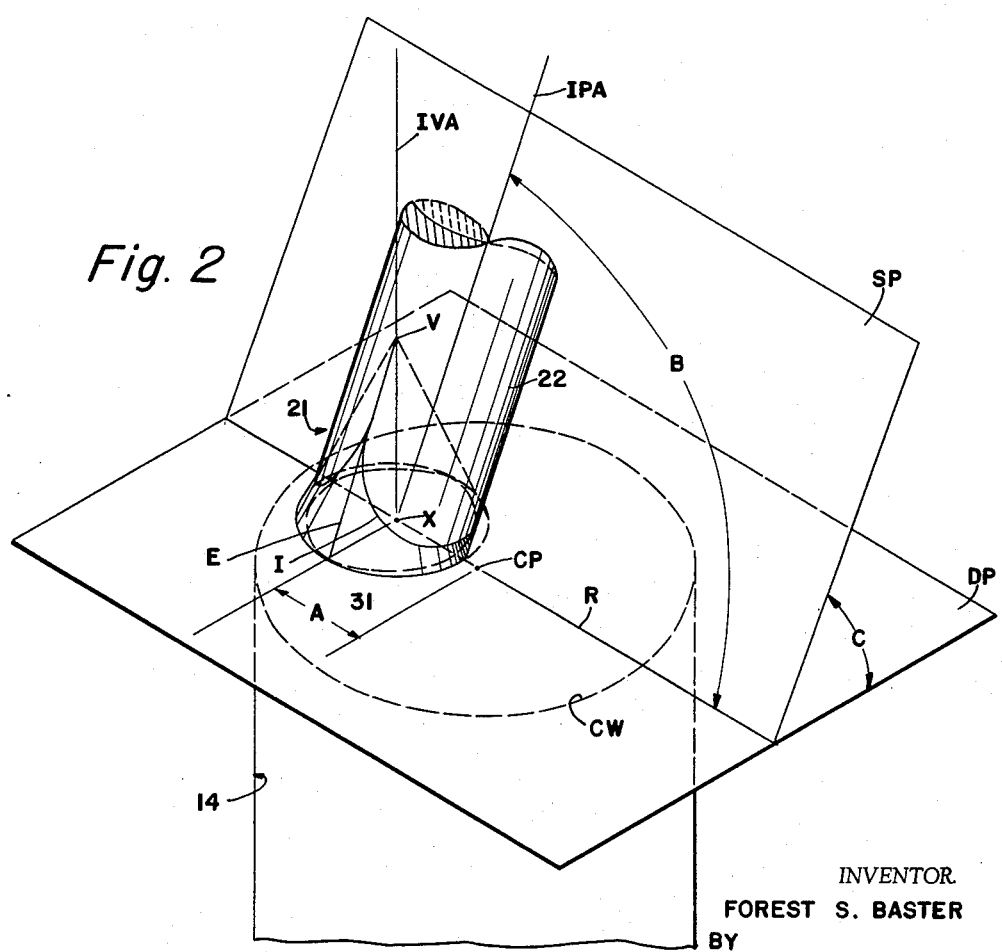
FIGURE 2 is an isometric diagrammatic view illustrating the determination of the skew direction of the intake port with respect to the cylinder of an engine having a combustion chamber ported according to this invention and the intersection of the geometric surfaces employed at the outlet portion of an intake port of a cylinder head in an engine made according to this invention.

Thus, the outlet portion 21 comprises a cylindrical section 22 and a conical section 31 tangent to each other at the major axis of the intersection of the cylindrical section 22 and the datum plane. FIGURE 2 also shows diagrammatically that in this particular disclosed embodiment the vertex V of the conical section 31 lies in the surface of an extension of the cylindrical section 22. Thus, these two sections 22 and 31 are also tangent along an element E of the conical section which extends from the vertex V to one of the two common points of tangency in the datum plane. Accordingly, the outlet portion 21 flares outwardly from the line of intersection of its cylindrical section 22 and conical section 31 into the opening of the valve seat 23. The conical section 31 thereby eliminates the lips that would otherwise exist at an elliptical exit of the cylindrical portion 22 into the circular opening of the valve seat 23.

As has been pointed out above, it is highly desirable to have precisely reproducible uniformity in port orientation and identical flow-directing surfaces at the port outlets which minimize turbulence, eddy currents, and the like, that evidently disturb and detract from the desired vortical path or swirl of the working fluid as it enters and fills an open combustion chamber. To whatever extent such disturbances continue to exist at varying load conditions and throttle settings in engines made according to this invention, they exist to substantially the same degree from cylinder to cylinder and from otherwise identical engines to identical engines. To achieve these results in mass production, the cylinder head 11 is first positioned in a jig and the cylindrical section 22 of the outlet portion 21 is machined along the port axis IPA to the described high degree of smoothness. This finish is preferably accomplished by a reaming and/or honing operation. Next a conical end mill is brought into the port exit with its axis positioned along the axis of the valve stem IVA. The mill is advanced until it assumes the position shown in phantom at 29 at FIGURE 4 to machine the conical section 31 of the outlet portion 21, again preferably to a smoothness of 50 micro-inches or smoother.

Normally the valve seat 23 is milled and ground at the port exit after the section 31 is finished and is at a substantially more divergent angle than the conical section 31. In production it is preferred that the valve seat be finished to a depth slightly less than the intersection the smallest depth of the conical section 31 at the point 34. This permits the regrinding of the valve seat during normal use and maintenance without causing the cylindrical section 22 to intersect the valve seat surface 23 and thereby lessen the effectiveness of the seal between the valve seat 23 and the head of the valve 18.

Figure 5:
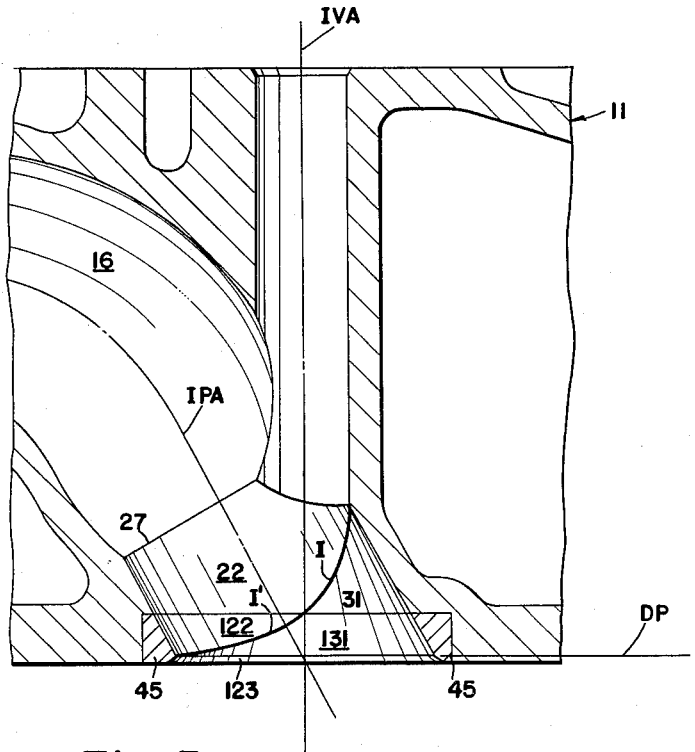
FIGURE 5 is a detail cross sectional view similar to FIGURE 3 showing the use of a valve seat insert.
Figure 6:
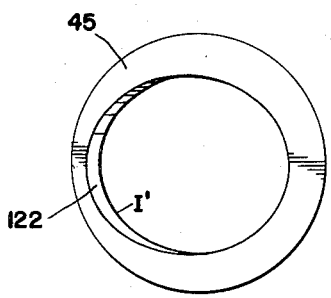
FIGURE 6 is a detail top plan view of the valve seat insert illustrated in FIGURE 5; and, FIGURE 7 is a bottom view of the valve seat insert shown in FIGURE 5.
Figure 7:
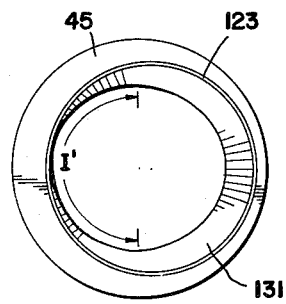

In the specific embodiment of this invention shown in FIGS. 3 and 4, the outlet portion 21 of the intake port and the valve seat 23 are all machined directly in the metal of the cylinder head 11. In the embodiment shown in FIGS. 5, 6, and 7, the cylinder head 11 is cylindrically counter-bored along an axis coinciding with or parallel to the valve axis IVA to receive an outwardly cylindrical hardened valve seat insert 45. The bore of the valve seat insert 45 is formed to provide extensions 122 and 131 of the corresponding cylindrical section 22 and conical section 31 removed by the counter-boring of the cylinder head. The sections 122 and 131 join along a line of intersection I', constituting an extension of the line of intersection I between the surfaces 22 and 31. As shown most clearly in FIG. 7, the insert 45 is also formed with a valve seat 123 corresponding to the valve seat 23 of the embodiment shown in FIGS. 3 and 4. It is to be understood that just as a part of the outlet portion an intake port may separately be formed and inserted in the cylinder head, so the entire outlet portion may be separately formed and inserted, either in initial manufacture of the engine, in maintenance and repair, or in rebuilding or modifying existing engines originally having differently designed intake ports.

The positioning of the port with respect to the cylinder is highly important if one is to obtain the optimum swirl effect. FIGURE 2 is intended to show graphically the positioning of the intake port with respect to the cylinder. In FIGURE 2 the projection of the walls of the cylinder 14 on the datum plane DP is designated by CW, which is a circle in the datum plane. The point X is within the circle CW. The point CP is the intersection of the axis CA of the combustion cylinder 14 with the datum plane DP. A reference line R, which necessarily includes a radius of the circle CW, connects the point X and the center point CP.

In locating the axis IPA of the intake port it is first necessary to locate the point X with respect to the cylinder and in the datum plane. This point X is preferably positioned such that the valve seat is as close to the cylinder walls CW as is possible, consonant with providing sufficient clearance between the valve and cylinder wall when the intake valve is open. The point X may be specified as lying a distance A from the point CP along reference line R. Preferably, the distance A is from 1/8 to 3/8 of the diameter of the cylinder.

The intake port axis IPA enters the cylinder skew to the cylinder axis CA. A skew plane SP is thus located by the reference line R and the port axis IPA. The axis IPA may be at various angles with the line R in the skew plane. This angle of the axis IPA with respect to R is designated in the drawing as the angle B. Preferably the angle B is 90 degrees and should be in that order (e.g., 75° to 105°) so that the working fluid introduced through the intake port enters the combustion chamber essentially tangentially with respect to the wall of the cylinder 14. The skew plane SP is at an angle C with the datum plane. The angle C is 60 degrees in the specific embodiment shown; it may vary between 30 to 80° proportionately to the length of stroke of the piston and the lift of the valve. The angle between axes IPA and IVA is 30° in the specific embodiment shown and may range between 0 and 45°.

The minimum length of the outlet portion, as measured along the intake port axis IPA, is approximately equal to the radius of the circular valve opening at the port exit. As the divergent fairing surface connecting the non-convergent cylindrical surface 22 of the flow-directing outlet portion 21 of the intake port to the valve seat 23, the surface 31 is, for convenience of machining, a right conical surface. It is to be understood that the surface 31 may be that of a more divergent solid of revolution provided that, at the port exit, it is no more divergent than the cone of the valve seat.

As a specific example of a compression-ignition engine which has been constructed and found to provide the outstanding advantage of this invention, the following dimensions apply:

The engine had cylinders of 5 1/8" and the stroke of each piston was 6 inches. The engine was a six cylinder in line engine having a total cubic inch displacement of 743 cubic inches. The cylinders, three per head, were closed by suitably gasketed, flat over-head valved heads of the construction shown in FIGURES 3 and 4. The diameters of the intake and exhaust port openings for each cylinder were 2.15 and 1.813 inches, respectively, at their valve seats. Fuel was injected directly into the cylinders through conventional nozzles.

The intake port for each cylinder was positioned such that the angle C between the datum plane DP and the skew plane SP was 60 degrees. The angle B between the port axis IPA and the radius line R was 90 degrees. The distance A along the radius line R from the center point of the cylinder, CP, to the point X was 1.4 inches. The diameter of the cylindrical section of the port swirl portion when finished to 30 microinch smoothness was 1 3/4" while the length of the swirl portion on its shortest side (the left hand side as viewed in FIGURES 3 and 5) was 7/8 inch. The angle at the apex of the conical mill used to produce the conical section 31 of the port was 60 degrees while the angle of the valve seat was a so-called 30 degree seat formed with a 120 degree mill.

In comparative tests subjecting engines to identical varying load conditions and using the same air-to-fuel ratios, the engine having the above dimensions produced an improvement in exhaust smoke of 3 to 4 Bachrach units over commercial engines that were identical except that their cylinder heads were conventional and not designed to provide intake ports made according to this invention. The efficiency of the engine expressed in terms of the brake specific fuel consumption was 0.377 as compared with 0.395 and higher of similar engines not equipped with the improved intake ports.

Although the invention has been described in its preferred form with a certain degree of particularity, it is understood that the present disclosure of the preferred form has been made only by way of example and that numerous changes in the details of construction and the combination and arrangement of parts may be resorted to without department from the spirit and scope of the invention as hereinafter claimed.

What is claimed is:

1. An internal combustion engine having head and block members defining a combustion chamber and a valved exhaust port in communication with the chamber, the combination of:
   (a) one of said members having an intake port formed therein;
   (b) said port having an exit communicating with the chamber;
   (c) said one member including a valve seat circumscribing said exit;
   (d) a valve member reciprocably carried by said one member and coactable with the seat to close said exit;
   (e) said port including a flow directing outlet portion terminating adjacent the exit;
   (f) said portion including a first section at a skew angle with the outlet and having a substantially smooth wall free of irregularities defining a non-convergent passage and a second section having a wall defining a solid of revolution tapering outwardly from the first section to the seat.

2. The device of claim 1 wherein the first section of the flow directing portion is a machined cylindrically contoured section.

3. The device of claim 1 wherein the second section is a segment of a cone.

4. In an internal combustion engine having head and block members defining a combustion chamber and a valved exhaust port in one of the members and in communication with the chamber, the combination of:
   (a) said head member having an intake port formed therein;
   (b) said port having an exit communicating with the chamber;
   (c) said head including a valve seat circumscribing said exit;
   (d) a valve member reciprocably carried by said head and coactable with the seat to close said exit;
   (e) said port including a cylindrically contoured section terminating near the exit;
   (f) said section being machined smoothly and disposed at a skew angle with a plane perpendicular to the axis of the combustion chamber; and
   (g) said port having a flaring portion flaring from the cylindrical section to the valve seat.

5. The device of claim 4 wherein the axis of said cylindrical section is in a skew plane located by said port axis and a radius of the combustion chamber and wherein the angle between said port axis and said radius is about 90°.

6. In an internal combustion engine having a head and a block defining a chamber and a piston reciprocably carried in the chamber, the combination of:
   (a) the head having intake and exhaust ports terminating at exits communicating with the chamber, each of said ports having a valve seat formed at its exit;
   (b) intake and exhaust valves reciprocably mounted in the head for selectively coacting with the seats to close said exits;
   (c) said intake exit being located on a radius of said chamber and being near the wall of the chamber;
   (d) said intake port including a smoothly machined outlet portion having a cylindrically contoured section terminating near said intake exit and defining a swirl axis at an angle with the chamber axis;
   (e) said portion also including another section having the contour of a segment of a cone and extending from the cylindrical section to the intake valve seat; and,
   (f) the cross sectional area of said cylindrical section being less than the upstream cross sectional area of the intake port.

7. The device of claim 6 wherein an extension of the cylinder generated by the cylindrically contoured section in an upstream direction is within the contour of the adjacent upstream portion of the intake port.

8. In an internal combustion engine the combination of:
   (a) a block having a plurality of cylinders each defining a portion of a combustion chamber;
   (b) a head secured to the block and having a plurality of paired intake and exhaust ports;
   (c) each port having an end exit in communication with one of the combustion chambers;
   (d) the head having a valve seat surrounding each of said exits;
   (e) inlet and exhaust valves reciprocably mounted in said head each adapted to close one of the ports;
   (f) each of said inlet ports having a stream directing cylindrically contoured section adjacent its exit and disposed at a skew angle with the communicating cylinder to emit a stream of fluid into the communicating cylinder;
   (g) each such cylindrical portion being machined smooth and free of irregularities and having substantially the same geometric relationship to its communicating cylinder as all other portions whereby to provide an engine in which the efficiency of and power generated by each of the cylinders is substantially identical; and,
   (h) each of said inlet ports having a flaring portion flaring from its cylindrical section to its valve seat.

9. The engine of claim 8 wherein each flaring portion has the contour of a segment of a cone connecting the cylindrical section of the port to the intake seat of the same port.

10. The method of making a head for an internal combustion engine having a block with a plurality of combustion cylinders comprising:
    (a) casting the head including intake ports;
    (b) machining a portion of each intake port adjacent the outlet end thereof to a smooth non-convergent contour while orienting the port portions such that each portion has substantially the same geometric relationship to an associated combustion cylinder as all other portions;
    (c) machining a section of each portion to the contour of a segment of a divergent solid of revolution connecting a remaining non-convergent section of the non-convergent machined portion to an outlet opening of the port; and
    (d) forming a valve seat at the exit of each intake port.

11. A reciprocating piston, internal combustion engine of the valve-in-head open-chamber type in which a piston reciprocates in a cylinder in the block of said engine and working fluid is intermittently admitted into the open combustion chamber of said cylinder through an intake port alternately opened and closed by a poppet valve, the head of which valve is carried by a stem and is adapted to close said port by seating on a circular valve seat provided at the exit of said port, said engine being characterized by the configuration of the outlet portion of said port adjacent and leading to said exit and the orientation of said portion with respect to the axis of said cylinder, said configuration and orientation being as follows:
    (a) the surface of said outlet portion is smooth and is comprised of a smooth, cylindrically contoured portion upstream of and adjacent to the surface of a non-converging solid of revolution faired into the circular opening of said port exit at said valve seat;
    (b) the axis of said outlet portion of said port and the axis of the stem of said valve have a substantially common point in a datum plane perpendicular to the axis of said cylinder;
    (c) the angle between said port axis and said valve stem axis ranges between 0° and 45°;
    (d) said substantially common point in said datum plane is located at a radial distance from the said cylinder axis which may vary from one-eighth to three-eighths of the diameter of said cylinder;

(e) said port axis is skew to said cylinder axis, lying in a skew plane located by said port axis and a radial line extending in said datum plane through the said substantially common point and the point of intersection of the datum plane by the cylinder axis;

(f) the angle between said radial line and said port axis ranges between 75° and 105°;

(g) the angle between said skew plane and said datum plane ranges between 30° and 80°.

12. In an engine having the intake port construction as defined in claim 11 in which the angle between said valve axis and said port axis is greater than 0° but not substantially greater than 45° and the surface of said outlet portion is faired into said port exit by the surface of a divergent solid of revolution having an axis substantially coinciding with said valve axis.

13. An engine having the intake port construction as defined in claim 12 in which the non-convergent surface of the outlet portion is cylindrical and the divergent surface is conical.

14. An engine having the intake port construction as defined in claim 13 in which an element of said cylindrical surface coincides with an element of said conical surface.

15. An engine having the intake port construction as defined in claim 13 in which the angle between said port axis and valve stem axis is substantially 30°.

16. An engine having the intake port construction as defined in claim 13 in which the angle between said radial line and said port axis is substantially 90°.

17. An engine having the intake port construction as defined in claim 13 in which the angle between said datum plane and said skew plane is substantially 60°.

18. As an article of manufacture, an insert for a cylinder head consisting of a body adapted to be received in a recess in a cylinder head and having a circular opening adapted to be concentric with the stem of a valve carried by said head when so inserted, said body comprising a divergent valve seat formed at said opening, a less divergent first surface of the contour of a segment of a cone in said opening having an axis concentric with the axis of said valve seat, and a second surface of a solid of revolution having an axis substantially intersecting the axis of the first surface at an angle greater than 0° but not substantially greater than 45°, said intersection being adjacent the center of said valve seat and said first and second surface having diametrically opposite substantially common points adjacent the inner edge of said valve seat.

19. An insert as defined in claim 18 in which said second surface is cylindrical.

20. An insert as defined in claim 19 in which the angle between the axes of the first and second surfaces is substantially 30° and the said surfaces have a substantially common line of tangency extending parallel to the axis of said second surface.

21. In an internal combustion engine having head and block members defining a combustion chamber and a valved exhaust port in one of the members and in communication with the chamber, the combination of:

(a) said head member having an intake port formed therein;

(b) said port having an exit communicating with the chamber;

(c) said head including a valve seat circumscribing said exit;

(d) a valve member reciprocably carried by said head and coactable with the seat to close said exit;

(e) said port including a cylindrically contoured section terminating near the exit, said cylindrical section being in a skew plane located by the port axis and a radius of the combustion chamber, the angle between the port axis and the radius being about ninety degrees, the skew plane being at an angle of thirty to eighty degrees with respect to a datum plane normal to the axis of the combustion chamber and the angle between the axis of the cylindrical section and the axis of the intake valve being from zero to forty-five degrees; and, (f) said section being machined smoothly and disposed at a skew angle with a plane perpendicular to the axis of the combustion chamber.

22. In an internal combustion engine having head and block members defining a combustion chamber and a valved exhaust port in one of the members and in communication with the chamber, the combination of:

(a) said head member having an intake port formed therein;

(b) said port having an exit communicating with the chamber;

(c) said head including a valve seat circumscribing said exit;

(d) a valve member reciprocably carried by said head and coactable with the seat to close said exit;

(e) said port including a cylindrically contoured section terminating near the exit, the axis of said cylindrical section being in a skew plane located by said port axis and a radius of the combustion chamber, the angle between said port axis and said radius being about ninety degrees, said cylindrical section being in a skew plane, the angle between the skew plane and a datum plane normal to the axis of the combustion chamber being from thirty to eighty degrees, the angle between the axis of the cylinder section and the axis of the intake valve being from zero to forty-five degrees; and, (f) said section being machined smoothly and disposed at a skew angle with a plane perpendicular to the axis of the combustion chamber.

23. The device of claim 22 wherein the angle between the planes is about sixty degrees.

24. In an article of manufacture, an insert for a cylinder head consisting of a body adapted to be received in a recess in a cylinder head, said body having:

(a) a through passage terminating at a circular opening adapted to be concentric with the stem of a valve carried by said head when the body is so inserted;

(b) a divergent valve seat formed at said opening;

(c) said passage including a cylindrically contoured section extending toward said opening from the end of the passage opposite said opening;

(d) a flaring portion connecting said cylindrical portion to said valve seat and disposed about an axis concentric with the axis of the valve seat;

(e) said cylindrical portion having an axis intersecting the axis of the flaring portion at an angle greater than zero degrees but not substantially greater than forty-five degrees, said intersection being adjacent the center of said valve seat; and (f) said cylindrical portion and said flaring portion having diametrically opposite substantially common points adjacent the inner edge of said valve seat.

References Cited in the file of this patent

UNITED STATES PATENTS 2,686,514    Nichols _____ Aug. 17, 1954

FOREIGN PATENTS 603,054    Great Britain _____ June 8, 1948
882,706    Great Britain _____ Nov. 15, 1961
1,226,744    France _____ Feb. 29, 1960